United States Patent
Lawrenson

[11] 3,770,407
[45] Nov. 6, 1973

[54] GLASS MANUFACTURING METHODS
[75] Inventor: Jack Lawrenson, St. Helens, England
[73] Assignee: Pilkington Brothers Limited, Liverpool, Lancashire, England
[22] Filed: Apr. 2, 1971
[21] Appl. No.: 130,731

[52] U.S. Cl. .................. 65/99 A, 65/182 R, 65/356
[51] Int. Cl. ............................................. C03b 18/00
[58] Field of Search ............... 65/99 A, 182 R, 356, 65/355, 186, 258, 137

[56] References Cited
UNITED STATES PATENTS
3,655,356  4/1972  Javaux ............................. 65/182 R
3,503,728  3/1970  Itakura ............................. 65/99 A
3,427,142  2/1969  Lajarte ............................. 65/99 A
3,316,077  4/1967  Plumat ............................. 65/182 R
3,486,869  12/1969  Alonzo et al. ...................... 65/99 A
2,119,949  6/1938  Blau et al. ........................ 65/134

FOREIGN PATENTS OR APPLICATIONS
119,189  10/1944  Australia ......................... 65/137
634,416  7/1960  Italy .............................. 65/182 R Primary Examiner—S. Leon Bashore
Assistant Examiner—Kenneth M. Schor
Attorney—Burns, Doane, Swecker & Mathis

[57] ABSTRACT

The temperature of the molten metal of the bath, in the float process for flat glass manufacture, is regulated by means of thermally conductive fins, e.g. of carbon, inset into the floor of the tank structure and in direct thermal contact with the molten metal of the bath. The outer end of each fin is cooled to give localised heat extraction from the molten metal.

5 Claims, 10 Drawing Figures

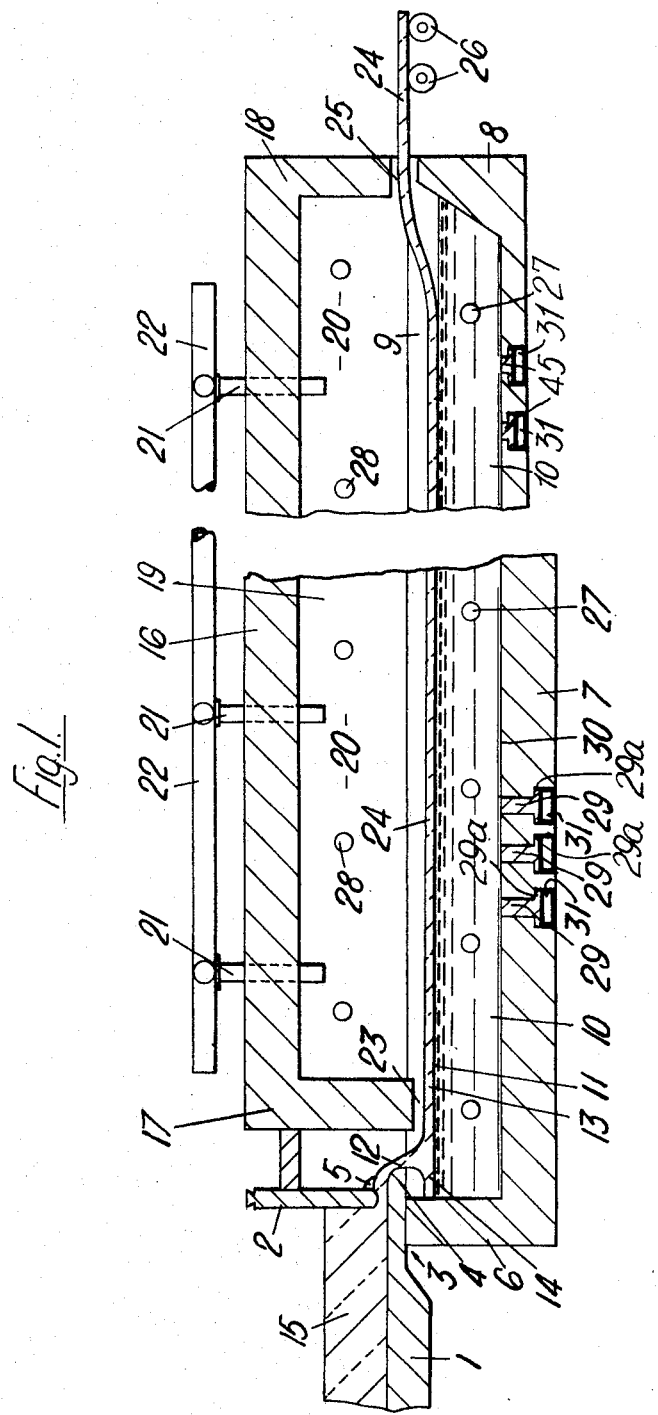

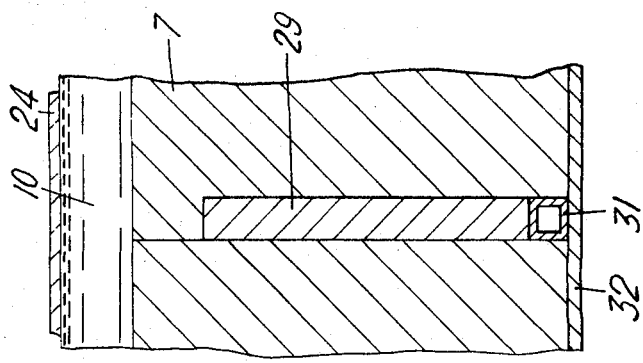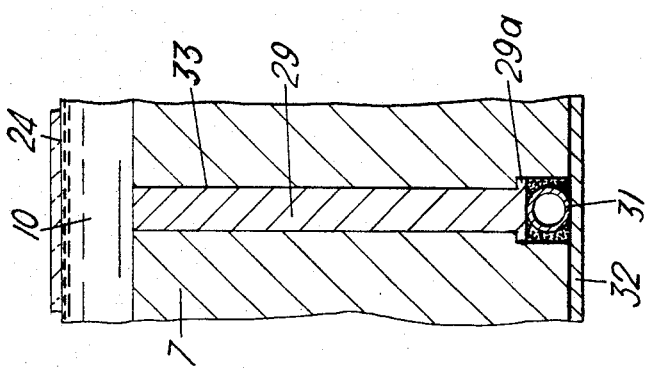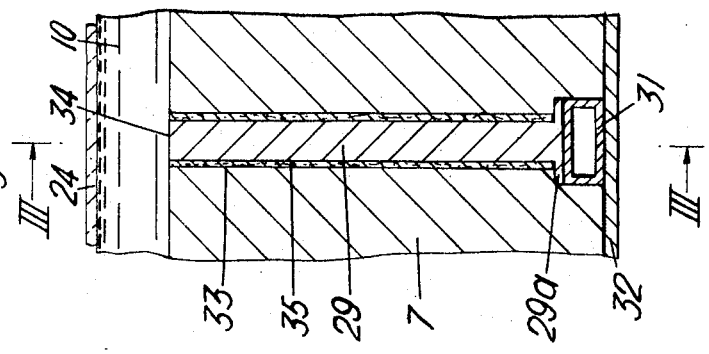

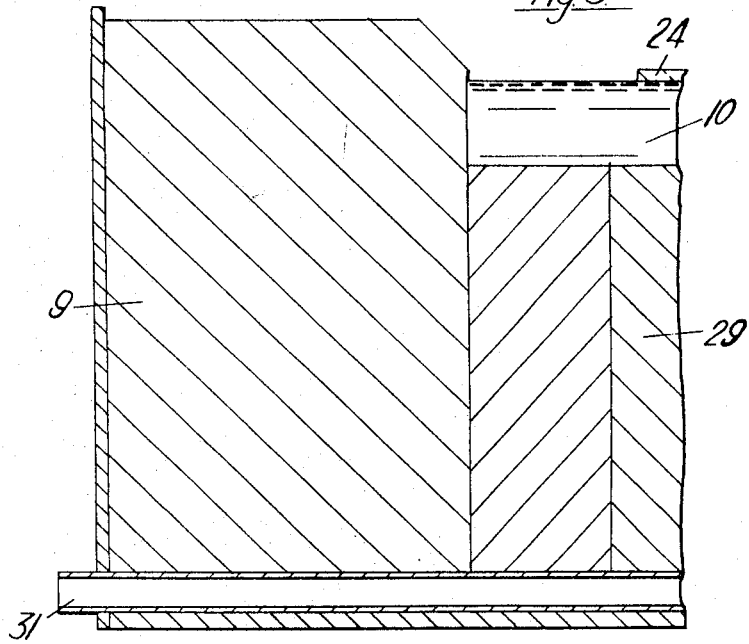
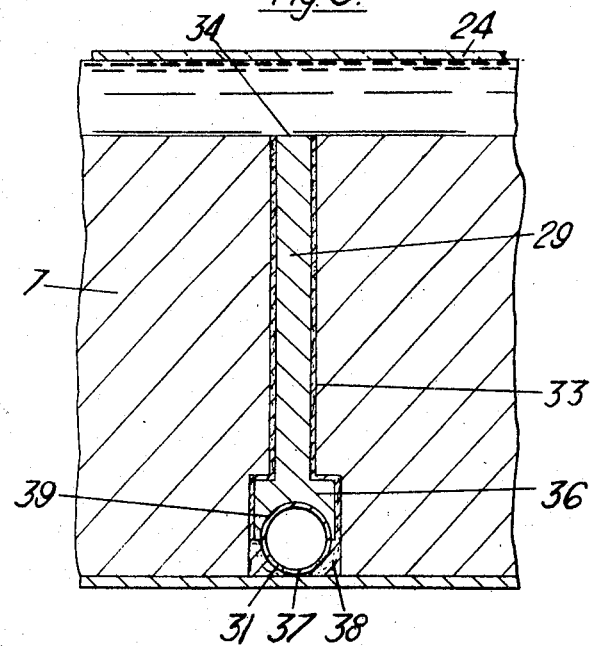

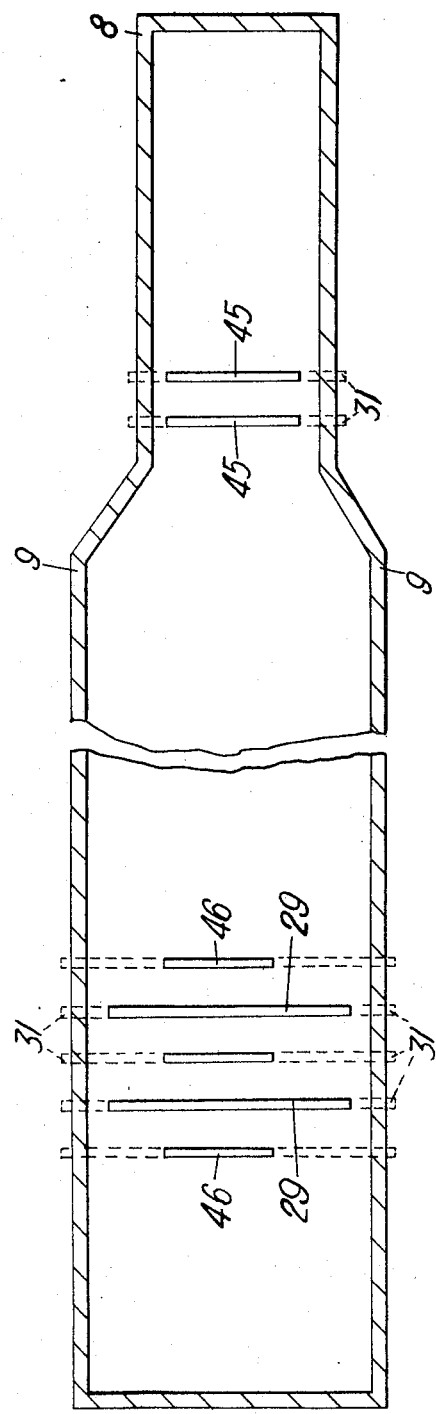

3,770,407

GLASS MANUFACTURING METHODS

BACKGROUND OF THE INVENTION

This invention relates to glass manufacturing methods and more especially to methods in which hot glass is in contact with molten metal.

The invention has particular application to the float process for the manufacture of flat glass in which glass in ribbon form is advanced along an elongated bath of molten metal, but is applicable to any other glass manufacturing process in which glass is in contact with molten metal for example in a vertical drawing process in which a ribbon of glass is drawn from a body of molten glass supported on molten metal in a drawing chamber, or a glass melting or fining process in which molten glass is supported on molten metal.

In all such processes the high thermal conductivity of the molten metal which has a large surface area of contact with the glass facilitates thermal control of the molten glass, and it is a main object of the present invention to provide an improved method and apparatus for regulating the temperature of the molten metal, thereby regulating the temperature and viscosity of the glass.

SUMMARY

In a glass manufacturing method in which hot glass is in contact with molten metal the temperature of the molten metal is regulated by employing a thermally-conductive channel a region of which is in heat exchange relationship with the molten metal. The temperature of the channel is regulated at a location spaced from that heat-exchange region to regulate heat flux along the channel from that region.

The invention is particularly applicable to the manufacture of float glass in which glass in ribbon form is advanced along an elongated bath of molten metal, and by employing the invention the temperature of the molten metal is regulated.

Accurate regulation of the cooling of the float ribbon during its advance is practiced particularly when the glass manufacturing process is being controlled to regulate the width and thickness of the ribbon of glass produced.

BRIEF DESCRIPTION OF THE DRAWINGS

FIG. 1 is a central longitudinal sectional elevation of apparatus for carrying out the float process including heat conducting means according to the invention inset in the floor of the tank structure containing the bath of molten metal, FIG. 2 is an enlarged view of one of the heat conductive means inset in the floor of the tank structure as shown in FIG. 1, FIG. 3 is a section on line III—III of FIG. 2 also showing one side wall of the tank structure, FIG. 4 is a view similar to FIG. 2 of another form of heat conductive means according to the invention inset in the floor of the tank structure, FIG. 5 is a similar view of yet another form of heat conductive means which does not extend right to the top surface of the floor, FIG. 6 illustrates yet another embodiment of heat extraction means in the floor of the tank structure, FIG. 10 is a plan view of the tank structure of FIG. 1 showing the disposition of heat conductive means according to the invention in the floor of the tank.

DESCRIPTION OF THE PREFERRED EMBODIMENTS

Figure 7:
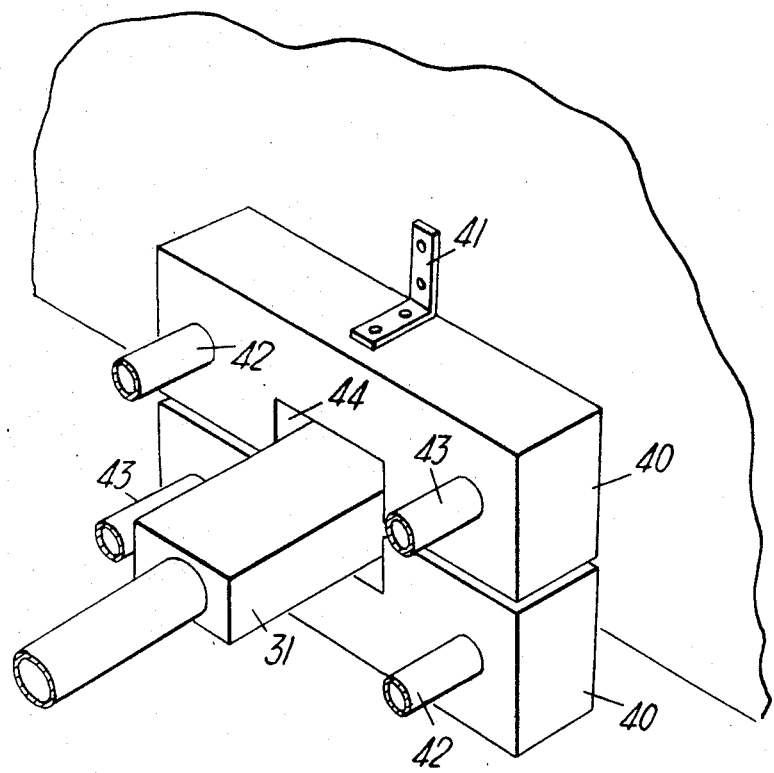
FIG. 7 is a perspective view of external cooling boxes associated with the heat conductive means of the invention.

Referring first to the general view of the float apparatus illustrated in FIG. 1, a forehearth of a continuous glass melting furnace is indicated at 1 and a regulating tweel at 2. A spout, indicated generally at 3, extends from the forehearth 1 and comprises a floor or lip 4, and side jambs 5, together forming a spout of generally rectangular cross-section.

The spout 3 extends over an end wall 6 at the inlet end of an elongated tank structure having a floor 7, an end wall 8 at the outlet end of the tank structure, and side walls 9 which together define an integral tank structure containing a bath 10 of molten metal whose surface 11 is at a level below the level of the spout lip 4 so that there is a free fall of a few inches of the molten glass 12 which is poured at a controlled rate over the spout lip 4 onto the bath of molten metal to establish a layer 13 of molten glass on the bath. The free fall of molten glass 12 from the spout ensures the formation of a heel 14 of molten glass beneath the spout which heel extends rearwardly under the spout lip 4 to the end wall 6 at the inlet end of the tank structure.

A head of molten soda-lime-silica glass 15 is held back on the forehearth 1 by the tweel 2 and the position of the tweel regulates the rate of pour of molten glass 12 over the spout lip onto the bath.

The tank structure supports a roof structure including a roof 16, an end wall 17 at the inlet end of the tank, and an end wall 18 at the outlet end, also side walls 19. The roof structure defines a headspace 20 over the molten metal bath 11 in which headspace a protective atmosphere is maintained at a plenum being supplied through ducts 21 which pass downwardly through the roof 16 and are connected to a header 22 which is itself connected to means, not shown, for supplying the protective atmosphere.

The inlet end wall 17 is spaced at a distance above the surface level 11 of the bath to provide an inlet 23, which is restricted in height, for the layer of molten glass 13 which advances through the inlet 23 along the surface of the bath of molten metal as the molten glass in the layer spreads laterally to establish a buoyant body of molten glass on the bath which body is advanced in ribbon form, as indicated at 24, and eventually cooled until it is sufficiently stiffened to be taken unharmed from the bath through an outlet 25 defined between the outlet end walls 8 and 18 of the tank structure and roof structure respectively, on driven conveyor rollers 26 which apply traction to the ribbon to control its rate of advance along the bath of molten metal.

Temperature regulators 27 are provided in the bath of molten metal and heaters indicated at 28 in the headspace over the bath, are regulated to define a temperature gradient down the bath to which the glass is subjected during its advance. The temperature at the inlet end of the bath is in the region of 1,000° C and at the outlet end of the bath the temperature is usually in the region of 650° C, at which temperature the viscosity of the glass is such that the ribbon can be taken unharmed from the bath by the driven rollers 26.

To assist the regulation of the temperature of the ribbon a number of channels for preferential heat transfer downwardly from the bottom of the bath beneath the path of travel of the ribbon of glass, are defined by blocks of thermally conductive material 29, for example blocks of machined graphite, which are inset into the floor 7 of the tank structure. In the embodiments illustrated in FIG. 1 there are three slab shaped blocks 29 inset into the tank floor 7 in a region of the bath spaced from the inlet end so as to assist the cooling of the glass after the layer has spread to form the buoyant body which is being advanced in ribbon form. Each of the carbon slabs 29 extends across the width of the tank structure and extends upwardly to the upper surface 30 of the floor of the tank structure so that the upper end of each block is in direct thermal contact with the molten metal of the bath.

The lower end of each slab is formed with an anchoring foot 29a, and is spaced by the height of the slab from the molten metal and is in thermal contact with a cooling tube 31 of square cross-section which is accommodated in the bottom of the floor 7. The cross-sectional area of the upper end of each slab provides the desired extent of thermal contact with the bath.

Flow of cooling fluid, usually water, through the tube 31 is controlled to regulate the temperature of the lower end of each of the slabs 29 thereby controlling the heat flux down each of the slabs from the molten metal of the bath so that there is accurately controlled heat-exchange between the upper end of each of the slabs 29 and the molten metal of the bath. This gives a desired control of heat flow from the glass 24 through the bath metal and through the upper surfaces of the slabs 29 and then down the slabs to the cooling tubes 31.

One of the heat transfer slabs 29 is illustrated in greater detail in FIGS. 2 and 3. The underface of the floor 7 of the refractory tank structure is covered by a steel shell 32 and the carbon slab 29 is inset in the elongated channel 33 in the refractory floor 7 and extending downwardly through the floor. The upper end 34 of the slab 29 is in direct thermal contact with the molten metal 10 of the bath. In the lower end of the channel 33 there is located a cooling tube 31 of rectangular section which is seated on the shell 32. The slab 29 is held firmly in the channel 33 of the floor 7 by a packing 35 of graphite wool. Carbon cement, or solidified molten tin, is used to ensure a good thermal contact between the surface of the cooled pipe 31 and the bottom face of the slab 29.

As shown in FIG. 3 the tube 31 extends outwardly right through the side wall 9 of the tank structure. The tube is connected to means, not shown, for supplying cooling water at a controlled rate and temperature.

FIG. 3 shows how the slab 29 extends laterally almost to the side walls 9 of the tank structure, that is at least across that part of the bath which is supporting the ribbon of glass 24, so that there is heat extraction downwardly from the whole of the undersurface of the passing ribbon through the bath metal 10 to the upper heat transfer surface of the slab 29, the heat being carried away at a controlled rate by the cooling water flowing through the pipe 31.

EXAMPLE 1

In a region near the hot inlet end of the tank structure the molten metal of the bath is at a temperature of 950° C. The dimensions of the slab 29 and operating characteristics are as follows:

| | |
|---|---|
| Height of slab | 2.7 dm |
| Width of slab across bath | 9.2 dm |
| Thickness of slab | 2.5 cm |
| Temperature of top of slab | 835°C |
| (1 cm below top surface of slab) | |
| Temperature of bottom of slab | 250°C |
| (2 cm above the bottom surface of slab) | |
| Rate of flow of cooling water | 125 cm$^3$. sec$^{-1}$ |
| Water inlet temperature | 9°C |
| Water outlet temperature | 22°C |
| Heat extraction along slab width | 0.74 kW. dm$^{-1}$ |
| Heat extraction across slab upper surface area | 25.6 W. cm$^{-2}$ |

EXAMPLE 2

In a region of the bath where the bath temperature is 750° C, dimensions of the slab 29 and operating conditions were as follows:

| | |
|---|---|
| Height of slab | 2.7 dm |
| Width of slab across bath | 9.2 dm |
| Thickness of slab | 2.5 cm |
| Temperature of top of slab | 633°C |
| (1 cm below top surface of slab) | |
| Temperature of bottom of slab | 174°C |
| (2 cm above bottom surface of slab) | |
| Rate of flow of cooling water | 115 cm$^3$. sec$^{-1}$ |
| Water inlet temperature | 9.8°C |
| Water outlet temperature | 19°C |
| Heat extraction along slab width | 0.5 kW. dm$^{-1}$ |
| Heat extraction across slab upper surface area | 20 W. cm$^{-2}$ |

EXAMPLE 3

At some locations of the bath with a similar bath temperature to Example 2, e.g. 740° C, a smaller slab was used as follows:

| | |
|---|---|
| Height of slab | 2.5 dm |
| Width of slab across bath | 7.5 dm |
| Thickness of slab | 2.5 cm |
| Temperature of top of slab | 615°C |
| (1 cm below top surface of slab) | |
| Temperature of bottom of slab | 200°C |
| (1 cm above bottom surface of slab) | |
| Rate of flow of cooling water | 180 cm$^3$. sec$^{-1}$ |
| Water inlet temperature | 29°C |
| Water outlet temperature | 34°C |
| Heat extraction along slab width | 0.5 kW. dm$^{-1}$ |
| Heat extraction across slab upper surface area | 20 W. cm$^{-2}$ |

EXAMPLE 4

At a lower bath temperature, e.g. 720° C a lower rate of heat extraction was achieved as follows:

| | |
|---|---|
| Height of slab | 2.5 dm |
| Width of slab across bath | 7.5 dm |
| Thickness of slab | 2.5 cm |
| Temperature of top of slab | 600°C |
| (1 cm below top surface of slab) | |
| Temperature of bottom of slab | 210°C |
| (1 cm above bottom surface of slab) | |
| Rate of flow of cooling water | 125 cm$^3$. sec$^{-1}$ |
| Water inlet temperature | 28°C |
| Water outlet temperature | 34.5°C |
| Heat extraction along slab width | 0.46 kW. dm$^{-1}$ |
| Heat extraction across slab upper surface area | 18.4 W. cm$^{-2}$ |

EXAMPLE 5

At the outlet end of the bath where the ribbon of glass is taken up from the bath surface the temperature of the bath is about 650° C, and the bath bottom blocks may be of reduced depth, as shown in FIG. 1, and a higher rate of heat extraction can be achieved as follows:

| | |
|---|---|
| Height of slab | 10 cm |

| | |
|---|---|
| Width of slab | 9.2 dm |
| Thickness of slab | 2.5 cm |
| Temperature at top of slab (1 cm below top surface of slab) | 540°C |
| Temperature at bottom of slab (1 cm above bottom surface of slab) | 160°C |
| Rate of flow of cooling water | 100 cm$^3$·sec$^{-1}$ |
| Water inlet temperature | 9.8°C |
| Water outlet temperature | 19.6°C |
| Heat extraction along slab width | 0.9 kW. dm$^{-1}$ |
| Heat extraction across slab supper surface area | 36 W. cm$^{-2}$ |

Another embodiment is illustrated in FIG. 4 in which the slab 29 is closely inset in the channel 33 cut in the refractory floor 7 of the tank, and is anchored by an integral foot 29a. The tube 31 is a tube of circular cross-section which is packed into the space at the bottom of the channel 33 by fine powdered graphite to give good thermal contact wth the fitting lower end of the graphite slab.

In another arrangement illustrated in FIG. 5 the slab 29 is not formed with an integral anchoring foot because it does not extend right to the surface of the floor but rather extends only to within 2.5 cm of the floor surface thereby cooling a spread region of the floor surface of the tank structure and increasing the capture of heat from the molten metal of the bath. This embodiment is particularly useful where a more generalised heat extraction is required rather than the more localised extraction of heat achieved using the embodiments of FIGS. 2 to 4.

In yet another embodiment illustrated in FIG. 6 the lower end of the graphite slab 29 has a widened cross-section, and the channel 33 in the floor 7 has a widened portion 37 at its lower end which receives the widened portion 36 of the slab. A stainless steel cooling pipe 31 of circular cross-section is packed into the lower end 37 of the channel by graphite wool 38. The lower end of the slab 29 is formed with a cylindrical concave surface 39 which engages closely over the cylindrical pipe 31 and good thermal contact between this cylindrical graphite surface 39 and the pipe is assisted by a packing of fine powdered graphite. This construction is particularly suitable where a high rate of heat extraction is required from a localised area of the bath defined by the narrower upper end 34 of the graphite slab 29.

As shown in FIG. 7 two external cooling boxes 40 may be provided surrounding the cooling tube 31 where it emerges through the tank side wall. The boxes 40 are fixed to the outlet shell of the tank side walls by retaining straps 41 and have individual water supply and exhaust pipes 42 and 43. A cooled passage 44 for the tube 31 is thus defined outside the tank, which solidifies any molten metal which might leak around the tube 31 in the event of a failure of its seal in the tank side wall.

Figure 8:
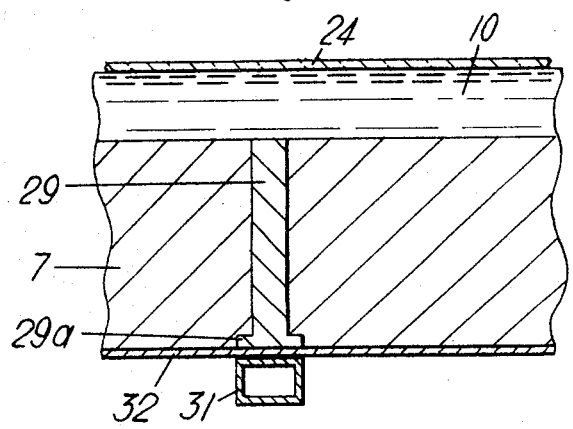
FIG. 8 illustrates an embodiment of the invention similar to that of FIGS. 2 and 3 but with a cooling tube mounted below the floor of the tank structure.

In the embodiment illustrated in FIG. 8 the slab 29 is closely inset in the channel 33 in the refractory floor 7 of the tank, and extends down to the steel shell 32 which covers the floor 7. The cooling tube is mounted beneath the steel shell 32 and in thermal contact with it so that heat is conducted from the lower end of the slab 29, through the shell 32, to the cooling tube 31.

The amount of heat extracted was about 65% of that extracted by the arrangement of FIGS. 2 and 3 where the tube 31 is in direct contact with the slab 29. This reduction in the rate of heat extraction can be tolerated in some circumstances when set against the convenience of access to the tube 31 and the fact that the tube does not have to be sealed into the tank floor.

Figure 9:
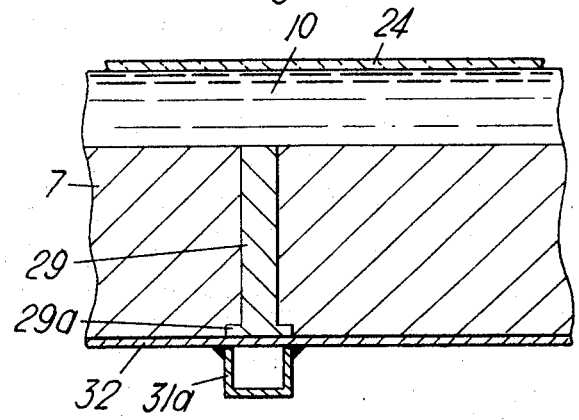
FIG. 9 is a variation of the embodiment of FIG. 8.

FIG. 9 illustrates a variation of the arrangement of FIG. 8, in which a U-channel member 31a is welded externally to the shell 32 to provide a closed cooling tube. This arrangement gave 80% of the heat extraction achieved with the arrangement of FIGS. 2 and 3.

Another region of the bath where cooling is controlled by the method of the invention with particular advantage is near the outlet end of the bath where the glass is being cooled just prior to being lifted from the bath surface and discharged through the outlet 25. Graphite slabs constructed as illustrated in FIGS. 2 and 3, or FIG. 4, FIG. 5, or FIG. 6 are employed also near the outlet end of the bath as indicated at 45 to provide a controlled cooling of the ribbon of glass to about 650° C just before it is contacted by the driven rollers 26.

In some circumstances the cooling may be preferred in a central region only of the bath. For example as illustrated at the left hand side of the tank structure shown in FIG. 10 the cooling slabs 45 near the outlet from the bath extend only transversely beneath a central region of the bath. Nearer the hot end of the tank structure in FIG. 7, in the region where the formed ribbon of glass is being cooled during the first part of its advance along the bath inset carbon slabs 29 extending across almost the whole width of floor of the tank structure alternative with shorter carbon slabs 46 inset in the same manner into the floor of the tank structure but extending only across a central region of the floor. This arrangement has been found particularly advantageous for use in ways when thin glass is being produced by the float process and the ribbon of glass is subjected to attenuation after cooling to a plastic state in which tractive forces applied to the glass cause a predetermined variation in width and thickness of the ribbon. The provision of the alternating wider and narrower heat conductive channels assists the maintenance of uniform temperature across the whole width of the ribbon of glass.

The flow of cooling water through each of the cooling pipes 31 is usually individually controlled and further control is achieved by controlling the temperature of the water supplied so as to ensure a regulation of the temperature gradient existing down each of the slabs 29.

The invention thus provides improved method and apparatus for selective control of the temperature of glass which is in contact with a body of molten metal.

By the provision of an array of heat conductive cooling slabs in the floor of the tank structure in the manner indicated in FIG. 7, which array may extend along the whole length of the tank structure, there is accurate control of localised cooling of the glass and so of the whole temperature gradient to which the glass is subjected during its customary cooling from about 1,000° C at the inlet end of the bath to about 650° C at the outlet end. The cooling of the ribbon of glass to a desired viscosity state, e.g. at 700° C to 750° C, to enable the ribbon to be gripped marginally prior to reheating for attenuation is particularly effective by means of the present invention.

Because the extraction of heat from the glass is through the agency of the molten metal which the glass contacts, thermal shock to the glass is avoided and the distortion free characteristics of the glass are not impaired as the glass is being subjected to a controlled cooling during its advance.

I claim:

1. A method of manufacturing flat glass in which glass in ribbon form is advanced along an elongated bath of molten metal, including regulating the temperature of the molten metal by extracting heat downwardly from the bottom of the bath beneath the path of travel of the ribbon of glass along the bath, through a slab of thermally conductive material having an upper heat transfer surface in direct thermal contact with the metal bath, said upper heat transfer surface having an extent in the direction of the path of travel of the ribbon less than the height dimension of the slab, and regulating the temperature of a lower portion of the slab to control heat transfer from the molten metal through the slab across the upper heat transfer surface at a rate of from about 18.4 to 36 watts per square centimeter of area of that upper heat transfer surface.

2. In apparatus for manufacturing flat glass comprising a refractory tank structure having a floor, side walls and end walls, and containing a molten metal bath along which a ribbon of flat glass is advanced, the improvement comprising at least one upright slab of thermally conductive material inset into the refractory material of the tank floor and extending transversely of the floor beneath the path of travel of the ribbon of glass, with the slab including an upper heat transfer surface having an extent in the direction of the path of travel of the ribbon less than the height dimension of the slab and in direct thermal contact with the bottom of the molten metal bath, and heat transfer means, including said slab and a cooling tube extending parallel to and in thermal contact with a lower portion of the slab, for extracting heat downwardly from the bottom of the bath through the slab across said upper heat transfer surface at a rate of from about 18.4 to 36 watts per square centimeter of area of said upper heat transfer surface.

3. Apparatus according to claim 2 wherein said slab comprises a carbon slab.

4. Apparatus according to claim 2 wherein said cooling tube includes a portion contained within said tank structure and a portion emerging therefrom, and wherein said heat transfer means further includes external cooling means surrounding said cooling tube where it emerges from said tank structure.

5. In apparatus for manufacturing flat glass comprising a refractory tank structure having a floor, side walls and end walls, and containing a molten metal bath along which a ribbon of flat glass is advanced, the improvement comprising at least one upright slab of thermally conductive material inset into the refractory material of the tank floor and extending transversely of the floor beneath the path of travel of the ribbon of glass, with the slab including an upper heat transfer surface having an extent in the direction of the path of travel of the ribbon less than the height dimension of the slab, said slab being disposed out of contact with said molten metal bath beneath a thin layer of the refractory material of the tank floor which overlies said upper heat transfer surface and is in direct thermal contact with said upper heat transfer surface and, at its surface, with the molten metal of the bath, said slab extending to within 2.5 cm. of the surface of said floor, and heat transfer means, including said slab and a cooling tube extending parallel to and in thermal contact with a lower portion of the slab, for extracting heat downwardly from the bottom of the bath through said layer and through the slab across said upper heat transfer surface at a rate of from about 18.4 to 36 watts per sq. cm. of area of said upper heat transfer surface.

* * * * *

UNITED STATES PATENT OFFICE
CERTIFICATE OF CORRECTION

Patent No. 3,770,407          Dated November 6, 1973

Inventor(s) Jack Lawrenson

It is certified that error appears in the above-identified patent and that said Letters Patent are hereby corrected as shown below:

Add to title page, line 30 "Foreign Application Priority Data, April 16, 1970, Great Britain, 18224/70".

Signed and sealed this 30th day of April 1974.

(SEAL)
Attest:

EDWARD M. FLETCHER, JR.
Attesting Officer

C. MARSHALL DANN
Commissioner of Patents